(12) United States Patent
Serati et al.

(10) Patent No.: US 6,924,923 B2
(45) Date of Patent: Aug. 2, 2005

(54) NONMECHANICAL WAVELENGTH-INDEPENDENT BEAM STEERER

(75) Inventors: Steve Serati, Golden, CO (US); Jay Stockley, Berthoud, CO (US)

(73) Assignee: Boulder Nonlinear Systems, Inc., Lafayette, CO (US)

( * ) Notice: Subject to any disclaimer, the term of this patent is extended or adjusted under 35 U.S.C. 154(b) by 19 days.

(21) Appl. No.: 10/618,043

(22) Filed: Jul. 11, 2003

(65) Prior Publication Data

US 2005/0007668 A1 Jan. 13, 2005

(51) Int. Cl.[7] .................. G02B 26/08; G02B 27/30; G02F 1/03; H01S 3/10

(52) U.S. Cl. .................. 359/302; 359/304; 359/641; 359/298; 359/260; 372/20

(58) Field of Search .................. 359/237, 245–247, 359/298, 299, 301–303, 196, 205, 641, 250, 253, 627, 304, 260, 577; 372/19, 20, 22

(56) References Cited

U.S. PATENT DOCUMENTS

| | | | |
|---|---|---|---|
| 5,059,008 A | 10/1991 | Flood et al. | |
| 5,825,523 A | 10/1998 | Amitai | |
| 6,480,334 B1 | 11/2002 | Farn | |
| 6,624,919 B2 * | 9/2003 | Lambert | 359/196 |
| 2001/0038483 A1 | 11/2001 | Lambert | |
| 2003/0030908 A1 * | 2/2003 | Cheng et al. | 359/577 |

OTHER PUBLICATIONS

A.F. Fray and D. Jones "Large–angle beam deflector using liquid crystals," Electron. Lett.: Aug. 1975, pp. 358–359, vol. 15, No. 16.

J.U. White "Very long optical paths in air," Journal of the Optical Society of America, May 1976, pp. 411–416, vol. 66, No. 5.

A. Sasaki and T. Ishibashi, "Liquid–crystal light deflector," Electron. Lett.,Mar. 1979, pp. 293–294, vol. 15, No. 10.

W. Goltsos and M. Holtz, "Agile beam steering using binary optics microlens arrays," Opt. Eng., Nov. 1990, pp. 1392–1397, vol. 11, no. 29.

P. F. McManamon, E. A. Watson, T. A. Dorschner, and L. J. Barnes, "Applications look at the use of liquid crystal writable gratings for steering passive radiation," Opt. Eng., Nov. 1993, pp. 2657–2664, vol. 32, No. 11.

E. A. Watson and L. J. Barnes, "Optical design considerations for agile beam steering," SPIE vol. 2120 Laser Beam Propagation and Control (1994), pp. 186–193.

E. A. Watson, P. F. McManamon, L. J. Barnes, and A. J. Carney, "Applications of dynamic gratings to broad spectral band beam steering," SPIE vol. 2120 Laser Beam Propagation and Control (1994), pp. 178–185.

(Continued)

*Primary Examiner*—Georgia Epps
*Assistant Examiner*—Jack Dinh
(74) *Attorney, Agent, or Firm*—Townsend and Townsend and Crew LLP

(57) ABSTRACT

Methods and devices are provided for steering an electromagnetic beam. The device includes a reflective element, a polarizer, a relay focusing element, and a modulation element. The polarizer is configured to transmit light of a specified polarization and to reflect light having other than the specified polarization. The relay focusing element is disposed to provide optical paths for the electromagnetic beam from a first spot position to a second spot position spatially displaced from the first spot position such that the optical paths encounter the reflective element and the polarizer. The modulation element is configured for selectively transforming a polarization of the electromagnetic beam to include a component of the specified polarization at a spatially localized position along the optical paths.

22 Claims, 7 Drawing Sheets

OTHER PUBLICATIONS

R. M. Matic, "Blazed phase liquid crystal beam steering," SPIE vol. 2120 Laser Beam Propagation and Control (1994), pp. 194–205.

B. L. Anderson, S. A. Collins, C. A. Klein, E. A. Beecher and S. B. Brown, "Highly parallel optical true time delay device for phased array antennas," Proceedings of The Sixth Annual ARPA Symposium on Photonic Systems for Antenna Applications, Monterey CA. (Mar. 7, 1996).

P. F. McManamon, et. al., "Optical Phased Array Technology," Proceedings of the IEEE, Feb. 1996, pp. 268–298, vol. 84, No. 2.

L. J. Friedman, D. S. Hobbs, S. Lieberman, D. L. Corkum, H. Q. Nguyen, D. P. Resler, R. C. Sharp, and T. A. Dorschner, "Spatially resolved phase imaging of a programmable liquid–crystal grating," Applied Optics, Nov. 1996, pp. 6236–6240, vol. 35, No. 31.

S. Serati and J. Stockley, "Advanced Liquid Crystal on Silicon Optical Phase Arrays," 2002 IEEE Aerospace Conference—Paper 5.0301 (2002).

P. F. McManamon and W. Thompson, "PAPA Array of Phased Arrays (PAPA) Laser Systems Architecture," 2002 IEEE Aerospace Conference—Paper 5.0601 (2002).

E. A. Watson and L. J. Barnes, "Implementing Optical Phased Array Beam Steering with Cascaded Microlens Arrays," 2002 IEEE Aerospcae Conference—Paper 5.0306 (2002).

J. Stigwall, "Optimization of a Spatial Light Modulator for Beam Steering and Tracking Applications," Thesis—Department of Physics and Measurement Technology, Linköping University (2002).

J. Stockley and S. Serati, "Cascaded One–dimensional Liquid Crystal OPAs for Beam Steering In Two Dimensions," 2003 IEEE Aerospace Conference—Paper 5.0701 (2003).

E. J. Haellstig, J. Stigwall, M. Lindgren and L. J. Sjoqvist, "Laser beam steering and tracking using a liquid crystal spatial light modulator," Proceedings of SPIE vol. 5087 *Laser Systems Technology* (2003).

S. R. Harris, "Numerical optimization of the performance of nematic liquid crystal optical phased arrays," Proceedings of SPIE vol. 5162 *Advanced Wavefront Control: Methods, Devices, and Applications* (2003).

S. R. Harris, "Polarization effects in nematic liquid crystal optical phased arrays," Proceedings of SPIE vol. 5213 *Liquid Crystals VII* (2003).

\* cited by examiner

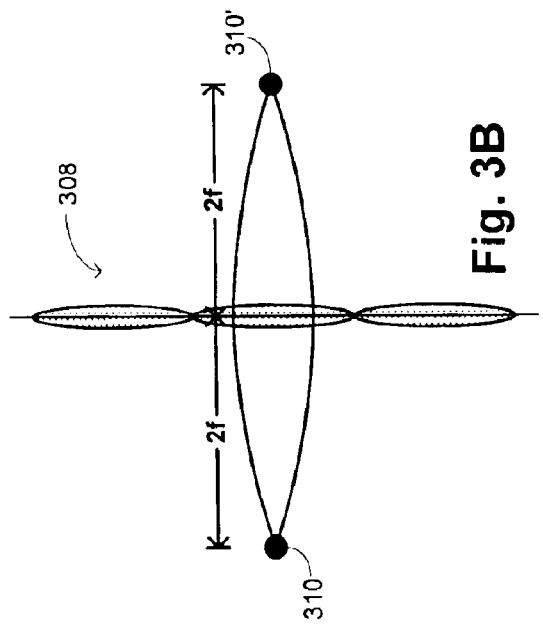
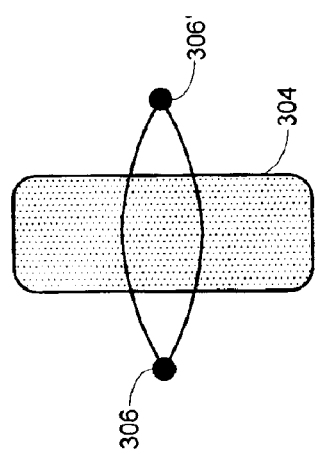
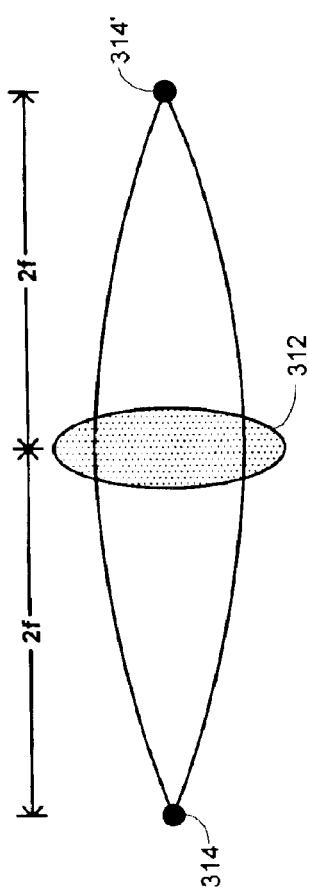
Fig. 3A
Fig. 3B
Fig. 3C

NONMECHANICAL WAVELENGTH-INDEPENDENT BEAM STEERER

BACKGROUND OF THE INVENTION

This application relates generally to steering of electromagnetic radiation. More specifically this application relates to nonmechanical methods and systems for steering an electromagnetic beam.

There are a large number of diverse applications in which steering of electromagnetic radiation, whether broadband or monochromatic, is desirable. Exemplary applications include a variety of satellite and antenna applications in which electromagnetic beams need to be steered to effect communication with or from the satellite or antenna. In other applications, electromagnetic beams may be steered as part of performing a scanning function, usually of a collimated beam. For instance, such scanning may be performed in ladar or lidar applications, in aiming systems where an aiming point is moving as a function of target range and velocity, in bar-code scanners, in linear scanners used in laser printers or plotters, and the like.

In current systems, beam steering is generally performed by mechanical means. For example, a scanning function may be implemented through the use of gimbaled, mechanically moveable optical elements, such as mirrors, lenses, and reflectors. It is well known that the inertia of such components impedes the efficiency of mechanical operations to effect steering when they are moved. There has accordingly been a general desire to minimize the amount of mechanical movement involved in performing steering functions. One approach that has recently been used involves the translation of microlens arrays, such as described in U.S. Pat. No. 5,059,008, the entire disclosure of which is incorporated herein by reference for all purposes. While such an approach exploits the fact that recent developments in micro-optics and binary optics may make mechanical steering operations less disruptive, the continued reliance on such mechanical approaches remains limiting.

There is accordingly a general need in the art for improved methods and systems for steering electromagnetic beams.

BRIEF SUMMARY OF THE INVENTION

Embodiments of the invention provide a completely nonmechanical mechanism for steering an electromagnetic beam. The beam is focused at a spot position within a focal plane of a steering lens or other collimation element, and then spatially translated nonmechanically to a new position within the focal plane. Light emanating from the beam at the translated position is then steered with the collimation element, with the steering angle being defined according to the position of the translated spot position relative to an optic axis of the collimation element.

Thus, in a first set of embodiments, a device is provided for steering an electromagnetic beam. The device comprises a reflective element, a polarizer, a relay focusing element, and a modulation element. The polarizer is configured to transmit light of a specified polarization and to reflect light having other than the specified polarization. The relay focusing element is disposed to provide optical paths for the electromagnetic beam from a first spot position to a second spot position spatially displaced from the first spot position such that the optical paths encounter the reflective element and the polarizer. The modulation element is configured for selectively transforming a polarization of the electromagnetic beam to include a component of the specified polarization at a spatially localized position along the optical paths.

In some such embodiments, at least one of the reflective element and the polarizer may be inclined with respect to an initial direction of propagation of the electromagnetic beam. Furthermore, there are a number of specific components that may be used in specific embodiments. For example, the relay focusing element could comprise a lens, such as a gradient-index lens, a lens array, or a singlet lens, among others. The modulation element could comprise a pixellated spatial light modulator, which may be transmissive or reflective in different embodiments. Also, in some instances, the reflective element and polarizer could be substantially flat. In addition, the relay focusing element could be disposed such that the electromagnetic beam is substantially focused at each encounter with the polarizer.

The device may be configured so that the second spot position is displaced in two dimensions from the first spot position within a plane orthogonal to an initial direction of the electromagnetic beam. For example, the device could further comprise a second reflective element, a second polarizer, a second relay focusing element, and a second modulation element. The second polarizer is configured to transmit light of the specified polarization and to reflect light having other than the specified polarization. The second relay focusing element is disposed to provide second optical paths for the electromagnetic beam from the second spot position to a third spot position. The third spot position is spatially displaced from the second spot position in a direction nonparallel to a displacement of the second spot position from the first spot position such that the second optical paths encounter the second reflective element and second polarizer. The second modulation element is configured for selectively transforming a polarization of the electromagnetic beam to include a component of the specified polarization at a spatially localized position along the second optical paths.

In another embodiment, the device may be configured to provide a pseudoisotropic beam by having the modulation element configured to transform the polarization of the electromagnetic beam to include the component of the specified polarization and to include a component orthogonal to the specified polarization for each of a plurality of encounters of the electromagnetic beam with the modulation element.

In another set of embodiments, a device is also provided for steering an electromagnetic beam. A focusing element is disposed to focus the electromagnetic beam onto a first spot position. An optical train is configured to translate the first spot position spatially to a second spot position nonmechanical by routing the electromagnetic beam through the optical train. A collimation element is disposed to collimate the electromagnetic beam emanating from the second spot position. The optical train may be configured using a reflective element, polarizer, relay focusing element, and modulation element as described above.

In a further set of embodiments, a method is provided for steering an electromagnetic beam. The electromagnetic beam is focused onto a first spot position. The electromagnetic beam is routed through an optical train to translate the first spot position spatially to a second spot position nonmechanical. The electromagnetic beam is then collimated after the electromagnetic beam emanates from the second spot position.

In these embodiments, the electromagnetic beam may be routed through the optical train by progressively focusing the electromagnetic beam onto spatially displaced intermediate spot positions. In addition, the electromagnetic beam may be routed by reflecting the electromagnetic beam from each of the intermediate spot positions to a subsequent spot position. A polarization of the electromagnetic beam may be selectively transformed to include a component of a specified polarization at a spatially localized location, so that, that component may be reflected from each of the intermediate spot positions and emanate from the second spot position.

In some instances, the second spot position may be displaced in two dimensions from the first spot position within a plane orthogonal to an initial direction of the electromagnetic beam. In one embodiment, the electromagnetic beam is routed to translate the first spot position to an intermediate spot position having a displacement component relative to the first spot position orthogonal to an initial direction of the electromagnetic beam. Thereafter, the electromagnetic beam is routed to translate the intermediate spot position to the second spot position. The second spot position has a displacement component relative to the intermediate spot position orthogonal to the initial direction of the electromagnetic beam and orthogonal to the displacement component of the intermediate spot position relative to the first spot position.

In other instances, the method may further comprise steering the electromagnetic beam by a supplementary beamsteering angle that is smaller than a least beamsteering angular discrimination provided by the combination of focusing the electromagnetic beam, routing the electromagnetic beam, and collimating the electromagnetic beam.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

FIGS. 3A–3C provide exemplary illustrations of different relay-focusing-element configurations that may be used in different embodiments;

DETAILED DESCRIPTION OF THE INVENTION

Figure 1:
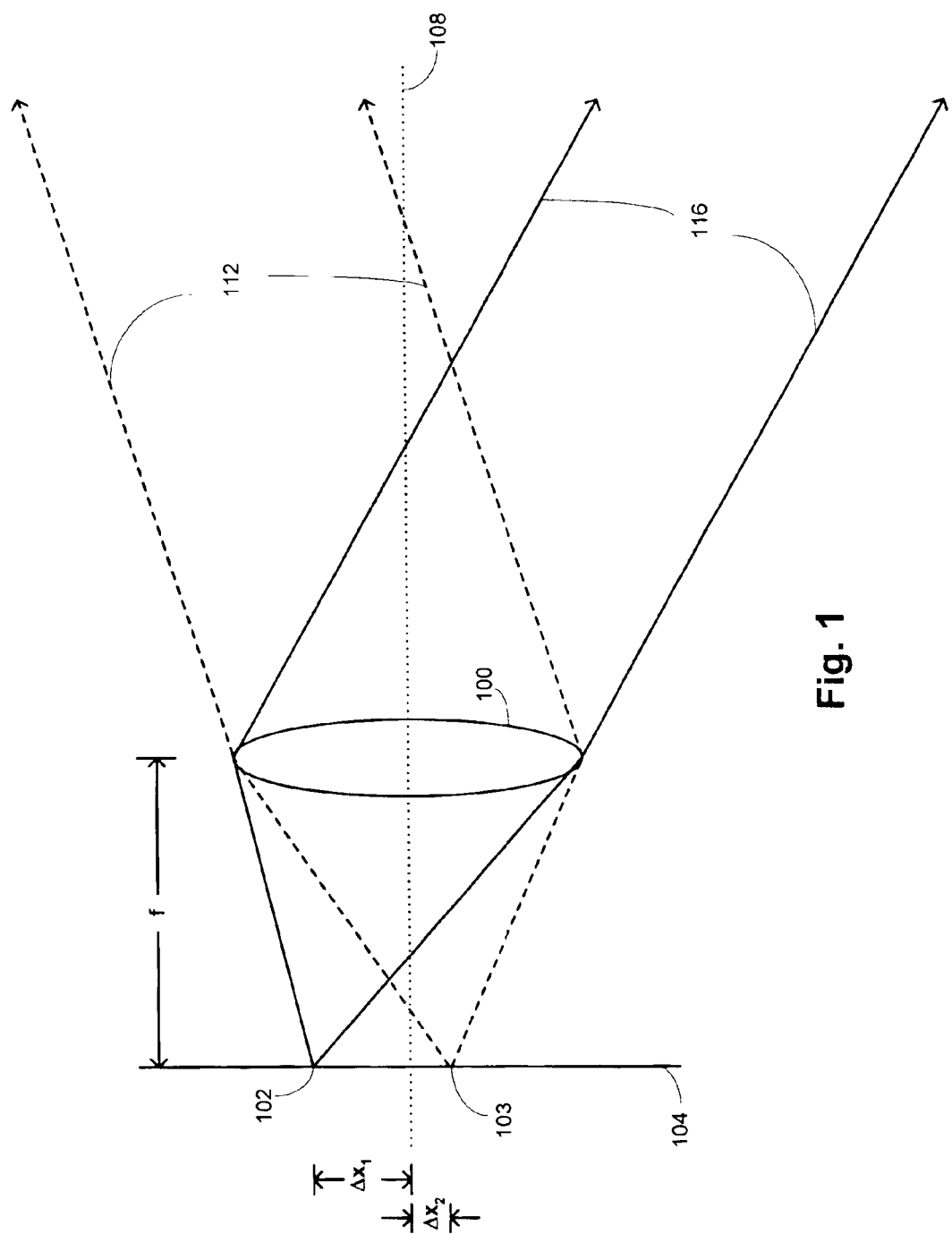
FIG. 1 provides a side view illustrating steering principles used in embodiments of the invention.

Embodiments of the invention use a nonmechanical method for steering electromagnetic beams, which may comprise broadband or monochromatic light, over a two-dimensional field of regard. In some instances, this is performed by controlling the position of a focused spot within the focal plane of a collimation element, such as a steering lens. In one embodiment, the position may be controlled through the use of a low-resolution spatial light modulator. The principles of this approach are illustrated schematically in FIG. 1, which provides a side view to illustrate the steering principles used in embodiments of the invention.

In the illustration, the collimation element is shown as a steering lens 100 having a focal plane 104 and an optic axis 108. Embodiments of the invention result in focusing of the beam to be steered onto a final spot position located substantially on the focal plane 104. A beam divergent from such a final spot position is collimated by the steering lens 100. Two examples are shown for different final spot beam positions: one spot position 102 at a distance $\Delta x_1$ above the optic axis 108 results in collimated beam 116 and another spot position 103 at a distance $\Delta x_2$ below the optic axis 108 results in collimated beam 112. Embodiments of the invention thus use the fact that spatial translation of the final spot position of the electromagnetic beam within the focal plane may be used to steer the electromagnetic beam. The steering angle θ may be expressed generally in terms of the focal length f of the collimation element and the radial distance $\Delta x$ of the spot position from the optic axis:

$$\theta = \tan^{-1} \frac{\Delta x}{f}.$$

Specific configurations are described below for localizing the spot position to achieve the desired steering. The potential size of the field of regard over which the electromagnetic beam may be steered is thus dependent on the focal ratio f/# of the steering lens or other collimation element. In particular, since the steering angle is a function of the displacement of the final spot beam from the optic axis, the maximum steering angle $\theta_{max}$ is related to the clear aperture of the collimation element 100. This clear aperture becomes 1/f/# when divided by the focal length of the collimation element 100. With the maximum displacement of the final spot beam from the optic axis being half the clear aperture, the maximum steering angle is given by $$\theta_{max} = \tan^{-1} \frac{1}{2f/\#}.$$

Advantageously, in some embodiments the collimation element is fast, i.e. has a low f/# in the case of a steering lens, which permits the electromagnetic beam to be steered over a wide field of regard. In one embodiment, the steering lens has an f/# less than two.

It will be evident to those of skill in the art that it is preferable for the spot of the electromagnetic beam to remain focused as its focal-plane position is translated to prevent beam spreading. One technique for accomplishing the translation nonmechanical with such a constraint is provided with the optical arrangement illustrated in FIG. 2. In this embodiment, an incident electromagnetic beam 224 is initially focused onto a first spot position 206 by a focusing element, shown in the exemplary embodiment as a focusing lens 204. An optical train is configured to translate the first spot position spatially to a second spot position nonmechanically by routing the electromagnetic beam through the optical train. The desired location of the second spot position, which defines the steering angle, may depend on a state of the optical train as described below. Light that emanates from the second spot position is collimated by a collimation element, again shown in FIG. 2 as a steering lens 100, in the manner described in connection with FIG. 1.

Figure 2:
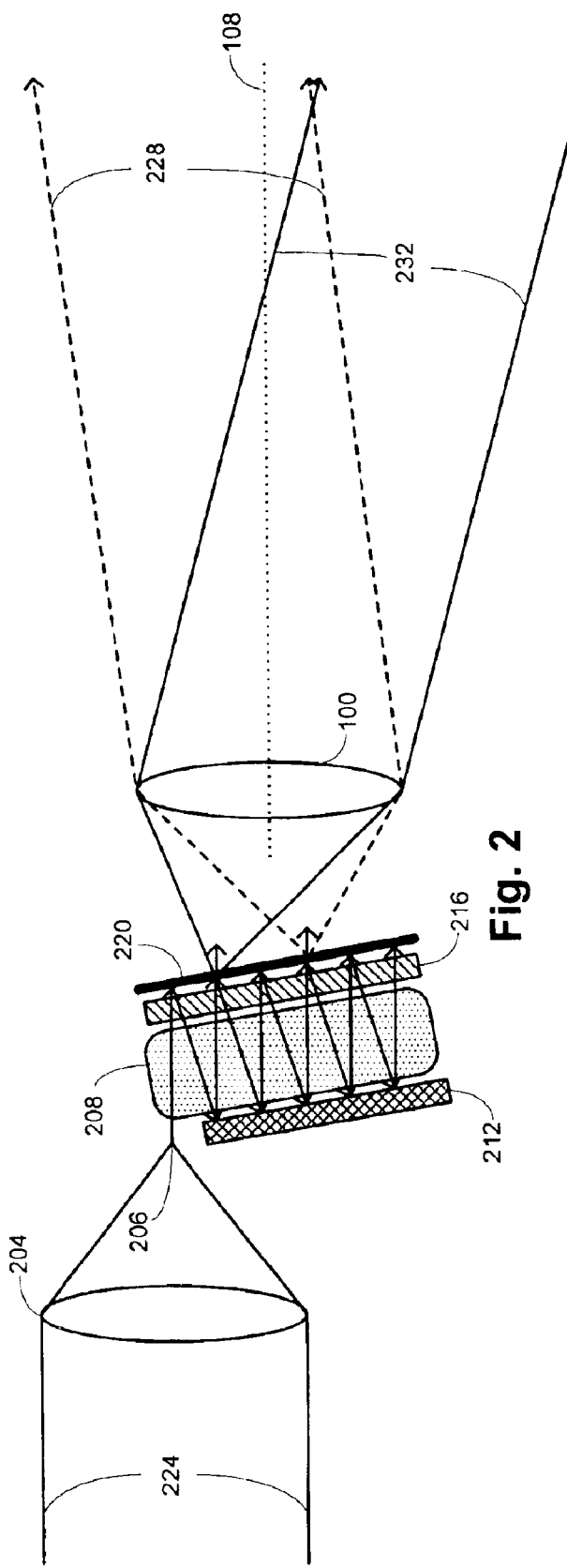
FIG. 2 provides a side view of an embodiment of the invention illustrating translation of a spot position in one dimension.

In the illustrated embodiment, the optical train comprises a relay focusing element, shown as relay focusing lens 208, that is disposed to provide optical paths for the electromagnetic beam that encounter a polarizer 220 and a reflective element 212 such as a mirror. The polarizer 220 may comprise, for example, a wire-grid polarizer and is adapted to transmit light of a specified polarization and to reflect light with other than the specified polarization. In some instances, a polarizer having such characteristics is referred to herein as a "reflective polarizer." The polarization of the electromagnetic beam may be transformed to include the specified polarization with a modulation element 216, such as a spatial light modulator ("SLM"). While the exemplary structure shown in FIG. 2 is illustrated for a transmissive SLM, it will be appreciated that a reflective SLM may be used in alternative embodiments. For example, a reflective SLM might be incorporated with the reflective element 212 on the opposite side of the relay focusing lens 208 in one such embodiment. One illustration of such an arrangement is provided in FIG. 7, which is discussed below in connection with the Example. The combination of the reflective characteristics of the polarizer 220, at least for certain polarizations, and the reflective element 212 cause the spot position to be translated through successive reflections. In some embodiments, translation of the spot position may be aided in part by inclining at least one of the polarizer 220 and reflective element 212 with respect to the optic axis of the focusing element 204.

FIGS. 3A–3C provide different examples of optical elements that may be used for the relay focusing element 208 in different embodiments. In each of these illustrations, the relay focusing element 208 acts to transfer an inverted real image from one end of the element to the other, thereby maintaining the spot in focus at the focal plane of the collimation element 100 as the electromagnetic beam is routed to different zones. It will be appreciated, however, that inversion of the image is not required, nor is image-to-image translation, provided that the final image after successive reflections through the optical train is provided on the focal plane of the collimation element. Such variations may be used in alternative embodiments of the invention. The examples shown in FIGS. 3A–3C illustrate different arrangements that may be suitable in different applications, with the embodiment of FIG. 3A providing a relatively high-compact arrangement and the embodiment of the FIG. 3C providing a less costly but relatively low-compact arrangement. In FIG. 3A, the relay focusing element comprises a gradient-index ("GRIN") lens 304 disposed such that focus 306 represents an intermediate spot position for the electromagnetic beam and point 306' represents an image of the focused spot. The compactness provided by use of a GRIN may be illustrated by noting that for a GRIN lens with 0.5 pitch, an inverted real image may be transferred from one end of the lens to the other, reimaging the spot over a distance less than 10 mm for light having a wavelength $\lambda \cong 1.55$ $\mu$m. FIG. 3B provides an example in which the relay focusing element comprises a microlens array 308 with a focused spot at intermediate spot position 310 and image point 310', both of which are twice the focal length away from the microlens array 308. FIG. 3C provides an example in which the relay focusing element comprises a singlet lens 312 at unit conjugate ratio with a focused spot at intermediate spot position 314 and image point 314', both of which are again twice the focal length away from the singlet lens 312.

In one embodiment, the SLM comprises a pixellated cell that controls the routing and launching of the beam at a desired location. For example, the pixellated cell could comprise a pixellated liquid-crystal cell. Each pixel in the cell may act as a variable retarder, thereby allowing the polarization of the electromagnetic beam to be controlled in a spatially localized manner with an applied voltage. By rotating or otherwise transforming the beam's polarization to include a component of the specified polarization, at least a portion of the beam may be transmitted through the polarizer 220, thereby defining the location of the second spot position. For example, FIG. 2 illustrates two different states for the optical train corresponding to different voltage applications to the modulation element 216 to define different spatially localized polarization transformations. In a first state, the electromagnetic beam has one encounter with the polarizer 220 and one encounter with the reflective element 212 before its polarization is changed by the modulation element 216. At that point, at least some of the electromagnetic beam is transmitted through the polarizer 220, as indicated with the solid divergent beam, for collimation by the collimation element 100 to provide collimated beam 232, which is a version of beam 224 steered in a first direction. In a second state, the electromagnetic beam has three encounters with each of the polarizer 220 and reflective element 212 before its polarization is changed by activation of the modulation element 216 at a different pixel location. At that point, at least some of the electromagnetic beam is transmitted through the polarizer 220, as indicated with the dashed divergent beam, for collimation by the collimation element 100 to provide collimated beam 228. This collimated beam thus corresponds to a version of beam 224 steered in a second direction. As is apparent from FIG. 2 in these examples, the second spot position for the first state of the modulation element 216 is above the optic axis 108 of the collimation element 100 so that the electromagnetic beam is steered downwards; conversely, the second spot position for the second state of the modulation element 216 is below the optic axis 108 of the collimation element 100 so that the electromagnetic beam is steered upwards.

In some embodiments, each launch zone may thus be controlled in an analog fashion that allows the pixel to be opaque or fully transmissive. When the pixel is opaque, the specified polarization is not included in the electromagnetic beam and it is reflected through the optical train to the next pixel. When the pixel is fully transmissive, the entire electromagnetic beam includes the specified polarization and the beam is launched at the second spot position. In still other embodiments, the pixel may be partially transmissive, such as when the electromagnetic beam includes the component of the specified polarization and also includes a component orthogonal to the specified polarization. In such instances, part of the beam is launched and part of the beam is reflected through the optical train to the next pixel. In some such embodiments, the beam is partially transmitted from each of a plurality of zones simultaneously, corresponding to the existence of a plurality of second spot positions, thereby forming a pseudo-isotropic beam in the far field.

While the description of FIG. 2 has been made for a particular routing direction, i.e. from the left to the right of the page, it should be appreciated that the principle of reciprocity allows the methods and apparatus of the invention alternatively to be used in the opposite direction. In particular, instead of a beam entering the optical train at the top of the focal plane and being routed downwards through successive reflections, a beam may be received by entering the collimation element 100 at a specific angle. In such reverse operation, element 100 acts to focus the received beam onto a spot at a particular location in the focal plane, thereby acting as a focusing element. A component of the focused beam that includes the specified polarization passes through the polarizer 220. If the pixel at that location is activated, the polarization of the transmitted light is changed by the modulation element 216 so that it is different from the specified polarization; accordingly, the transmitted light is reflected at each subsequent encounter with the reflective element 212 and polarizer 220 so that its spot position is translated to the top of the focal plane to exit the optical train for collimation by element 204. At a non-activated pixel, a focused beam that is transmitted through the polarizer 220 does not have its polarization changed, and is therefore transmitted back through the polarizer 220 on its next encounter to leave the system.

In addition, it will be appreciated that the specific elements discussed in connection with FIG. 2 are exemplary and that the scope of the invention is intended to cover alternative elements. For instance, while the polarizer 220 and reflective element 212 are shown as substantially flat in FIG. 2, they might have some curvature in alternative embodiments. Indeed, such curvature could be used to compensate for inclination of the polarizer 220 and/or reflective element 212 with respect to the optic axis of the focusing element 204 to ensure that the potential second spot positions remain substantially within the focal plane of the collimation element 100. Still other variations may be made without exceeding the intended scope of the invention.

Figure 4:
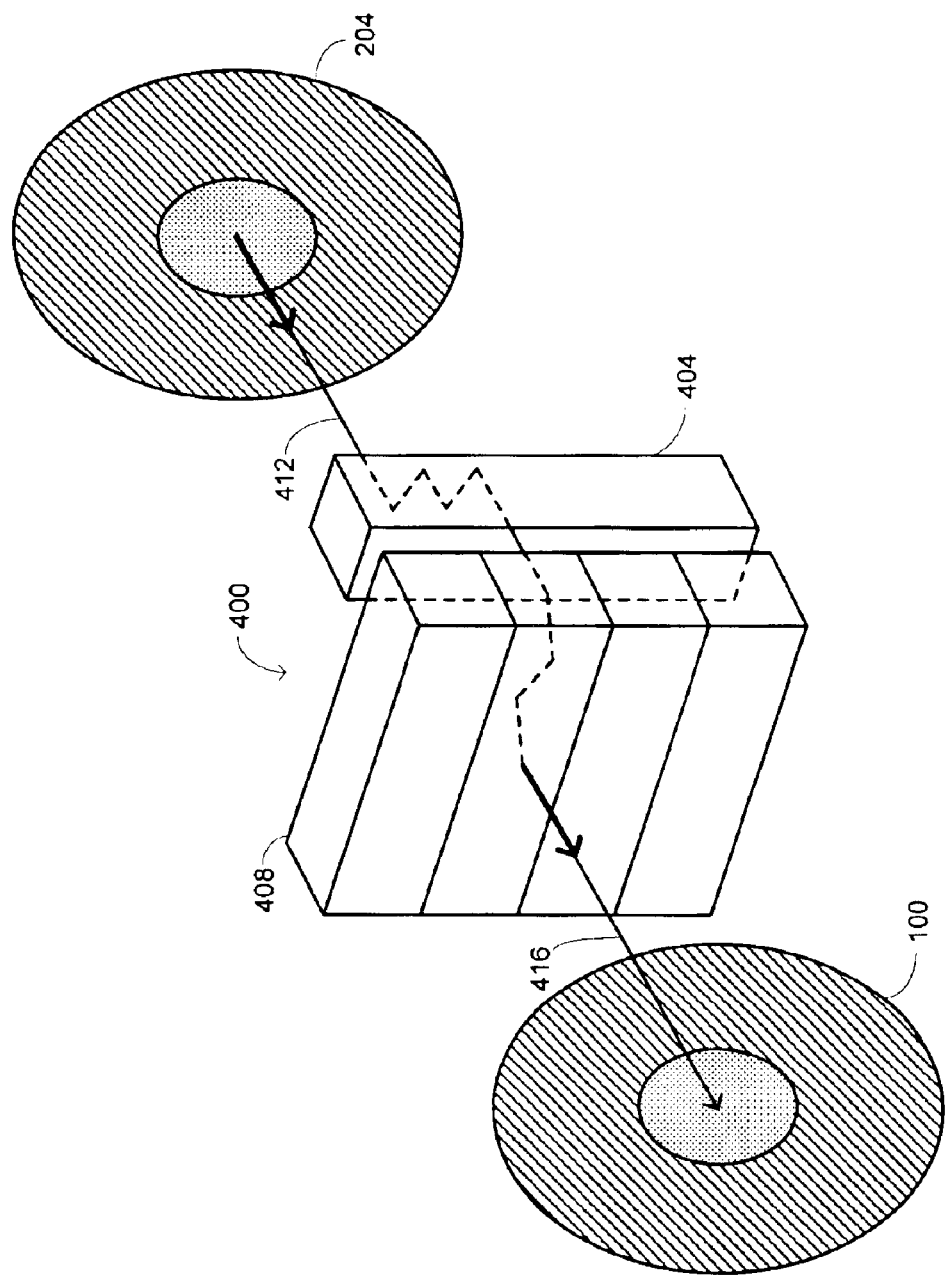
FIG. 4 provides a perspective view of another embodiment of the invention illustrating translation of a spot position in two dimensions.

In some embodiments, the optical train may comprise a plurality of component sections oriented differently to effect two-dimensional steering of the electromagnetic beam. An illustration of one such embodiment is provided in perspective view in FIG. 4. In this embodiment, the optical train 400 again provides optical paths for spatial translation of a spot position, but this time in two directions. First, translation of the spot position is effected vertically with a first stage 404 of the optical train 400. Next, horizontal translation of the spot position may be effected with a second stage 408 of the optical train. Each of these stages may use the structure described in connection with FIG. 2, although in some embodiments at least one of the two stages may include a plurality of such structures to accommodate different positions of the spot position provided by the other of the two stages. For instance, in the illustration in FIG. 4, the horizontal stage 408 includes a plurality of structures like the one described in connection with FIG. 2 to effect horizontal translation at any of the vertical spot positions that may be provided by the vertical stage 412.

Thus, in one embodiment, the vertical stage may comprise a relatively thin vertical strip having 1×M pixels, with the electromagnetic beam being reflected successively until it encounters an active pixel that launches it into the horizontal stage. The horizontal stage may have a plurality M' of strips that each have 1×N pixels; in a particular embodiment, M is conveniently equal to M' so that there is a one-to-one correspondence between spot positions provided by the vertical stage and pixel strips provided by the horizontal stage. In another embodiment, the horizontal stage may comprise a single 1×N strip having extended pixel structures so that each pixel comprises a relatively long vertical strip, i.e. having approximately the same length as the vertical stage. The total number of encounters with polarizers comprised by the optical train in either embodiment is thus given by the sum of the number of encounters in each stage and is therefore ≦M+N. Such arrangements for the optical train may thus be considered to provide a second spot position for the electromagnetic beam intermediate between the first and second stages 404 and 408, and to provide a third spot position for the beam at an end of the second stage 408. In such embodiments, collimation of the beam is provided with the collimation element 100 to the electromagnetic beam emanating from the third spot position.

It will be appreciated that while there are a variety of physical configurations that may be adopted with such embodiments, the optic axis of the focusing element 204 may conveniently be aligned with an edge of the collimating element 100, with the optical train 400 disposed so that the horizontal stage 408 substantially fills the usable focal-plane area defined by the collimating element 100. Furthermore, while the illustrated embodiment shows a preferred configuration in which strips for the horizontal and vertical stages are substantially orthogonal to each other, it is possible in alternative embodiments for those stages to be nonorthogonal. Provided the stages are nonparallel, they may still permit two-dimensional translation of spot positions and, therefore, two-dimensional beam steering. Such nonorthogonal configurations could be useful, for example, in embodiments where relatively coarse steering is needed in one direction and a finer steering capability is needed in an orthogonal direction.

As the electromagnetic beam is routed to a new position through the optical train, it may lose some energy with each reflection. While it is generally desirable to minimize such losses, there are some applications in which it is particularly desirable to do so. This is true, for example, in laser-communication, ladar, infrared-imaging, and other applications. The size of the loss may be substantially mitigated by index matching the various optical components comprised by the optical train and by using highly reflective elements 212 and reflective polarizers 220. The use of such components minimizes the size of the loss associated with each reflection through the optical train. In addition, in some embodiments, the number of reflections themselves may be reduced by increasing the coarseness of the optical train. For most applications, resolution requirements compete with the desire to minimize the number of reflections, i.e. when the number of reflections is small, the resolution is also small, and an attempt to increase resolution by increasing the number of reflections also increases the loss.

Accordingly, in some embodiments, a relatively coarse optical train configured such as described in connection with FIG. 2 is optically coupled with a supplementary beamsteering component that provides relatively fine-angle beamsteering. In particular, the beamsteering angle provided by the supplementary beam-steering component is smaller than a least beamsteering angular discrimination provided by the coarse beamsteering arrangement. One exemplary embodiment that includes such a coupling of fine-angle and coarse-angle beamsteering arrangements in illustrated in FIG. 5. The coarse-angle beamsteering arrangement is denoted generally by reference numeral 504 and is shown in an embodiment having the structure described in connection with FIG. 2. The fine-angle beamsteering arrangement is denoted generally by reference numeral 502 and is illustrated in an exemplary embodiment as comprising a plurality of optical phased arrays. In other embodiments, a fast steering mirror may be used, or any other suitable fine-angle beamsteering arrangement. The fine-angle beamsteering arrangement 502 may conveniently be disposed to be encountered before the coarse-angle beamsteering arrangement 504, although it is possible in some alternative embodiments for fine-angle steering to be performed subsequent to coarse-angle steering.

The plurality of optical phased arrays comprised by the fine-angle beamsteering arrangement 502 illustrated in FIG.

5 provides relatively high angular resolution over a wide steering angle. A first of the optical phased arrays 508 provides steering of a beam 516 in a first direction, say x, and a second of the optical phased arrays 512 provides steering of a beam in a second direction, say y, to produce beam 520 incident on the coarse-angle beamsteering arrangement 504. While it is generally preferable that the x and y directions be orthogonal, this is not required and they could alternatively be nonorthogonal but also nonparallel. This arrangement for the fine-angle beamsteering device 502 provides zone fill and adaptive wavefront control. In embodiments that use liquid-crystal-on-silicon ("LCOS") optical phase arrays, the fine-angle beamsteering arrangement 502 provides good resolution over ±3°. Merely by way of example, in a specific embodiment, the coarse steering arrangement 504 comprises a steering lens 100 having f/#=0.87 and an optical train with a 10×10 pixellation; such an arrangement, in combination with the use of LCOS optical phase arrays, the fine-angle beamsteering arrangement 502 provides high-resolution coverage in azimuth and elevation over ±30°.

Figure 5:
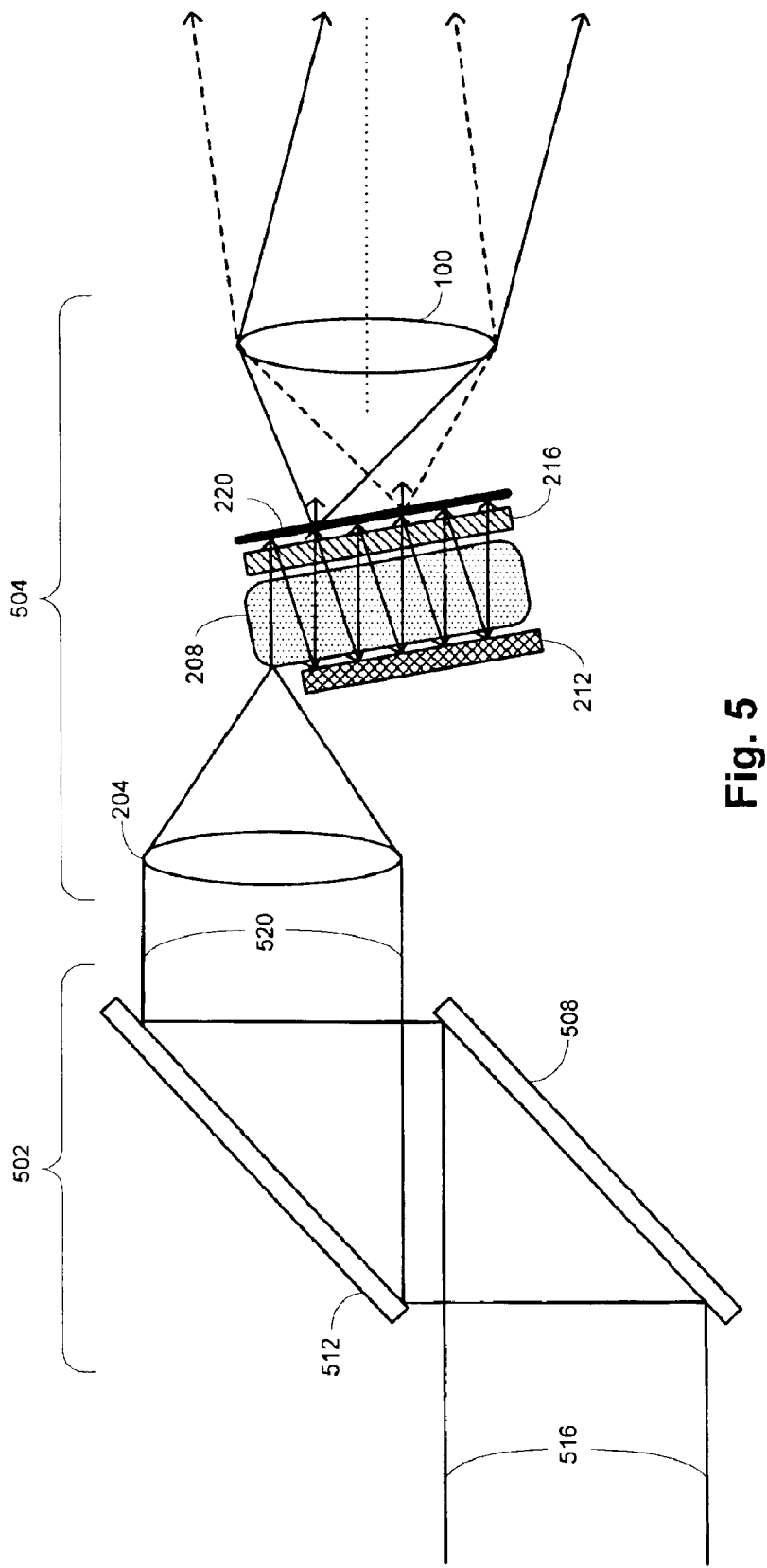
FIG. 5 provides a side view of an embodiment of the invention that combines coarse steering and fine steering control.

The basic configuration illustrated in FIG. 5 is completely scalable. In particular, large apertures and high power may be accommodated simply by using larger optical components. The are some specific applications, however, in which the use of large components is constrained by physical requirements of the applications. This is true, for example in applications where the optical components are mounted on aircraft or spacecraft. In such cases, size constraints may be imposed by virtue of any or all of the following considerations, among others: (1) the possibility of interference with other platform functions such as the desire to maintain a low radar cross section; (2) the lack of continuous window area to provide an adequate field of regard with sufficient optical gain; (3) the existence of single-point failure modes from debris or physical damage; and (4) a susceptibility to performance degradation from environmental effects such as turbulence and/or scintillation.

Figure 6:
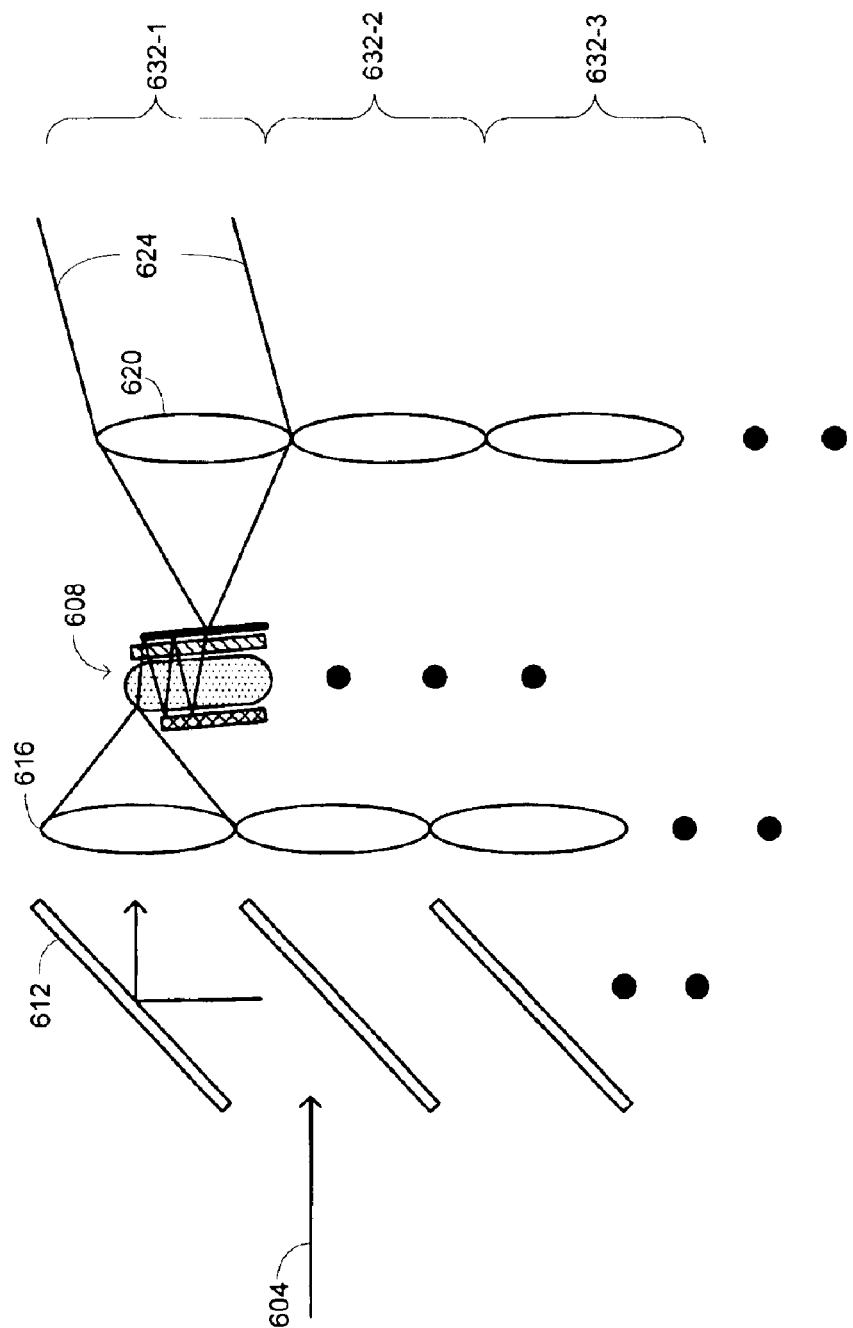
FIG. 6 provides a side view of an embodiment of the invention that uses a phased-array-of-phased-arrays architecture.

The effects of these considerations may be mitigated in another embodiment by combining a plurality of relatively small apertures to mimic a larger aperture. For example, a phased-array-of-phased-arrays ("PAPA") architecture may be used as illustrated in FIG. 6. The use of multiple small apertures simplifies placement of the structures and provides for less interference with the platform since less continuous window area is needed. In the embodiment shown in FIG. 6, multiple stages 632 are grouped together to act as a single aperture. Each stage 632 may comprise a beamsteering arrangement as illustrated in FIG. 2 or, alternatively and as illustrated in FIG. 6, may comprise a fine-angle steering arrangement optically coupled with a coarse-angle steering arrangement as illustrated in FIG. 5. In this arrangement, an incident beam 604 is initially subject to fine-angle steering by optical phased arrays 612, is focused by focusing element 616 onto optical train 608, which shifts the focused spot position, and is subsequently collimated by collimation element 620 to produce steered beam 624. This is performed for each of the plurality of aperture segments, which when distributed provide the advantage that damage to part of the overall aperture does not produce a catastrophic failure of the system.

The received signal from each stage 632 contributes to the overall optical gain of the system within which the beamsteering device is incorporated. If each stage 632 provides an aperture segment that is smaller than a spatial coherence length of the input signal 604, then the optical gain at each stage 632 is advantageously not diminished by turbulence or by scintillation. As will be evident to those of skill in the art, the individual stages 632 may be phased to contribute coherently to the overall gain of the system. In particular, the gain is directly proportional to the aperture area, which itself increases linearly with the number of stages 632 in the architecture. This may be contrasted with the case where the individual stages 632 are not phased for coherent contribution, in which case the effective gain increases only by the square root of the number of stages 632. Thus, the optical gain may be improved by using multiple aperture stages when turbulence limits the coherence length of the signal to less than the effective aperture. By using such phasing in low-turbulence circumstances, use of the segmented aperture does not adversely impact overall performance of the beamsteering device significantly if the fill factor for the array is kept relatively high. This is possible when the compact configuration shown in FIG. 5 is used in the PAPA architecture shown in FIG. 6.

EXAMPLE

Figure 7:
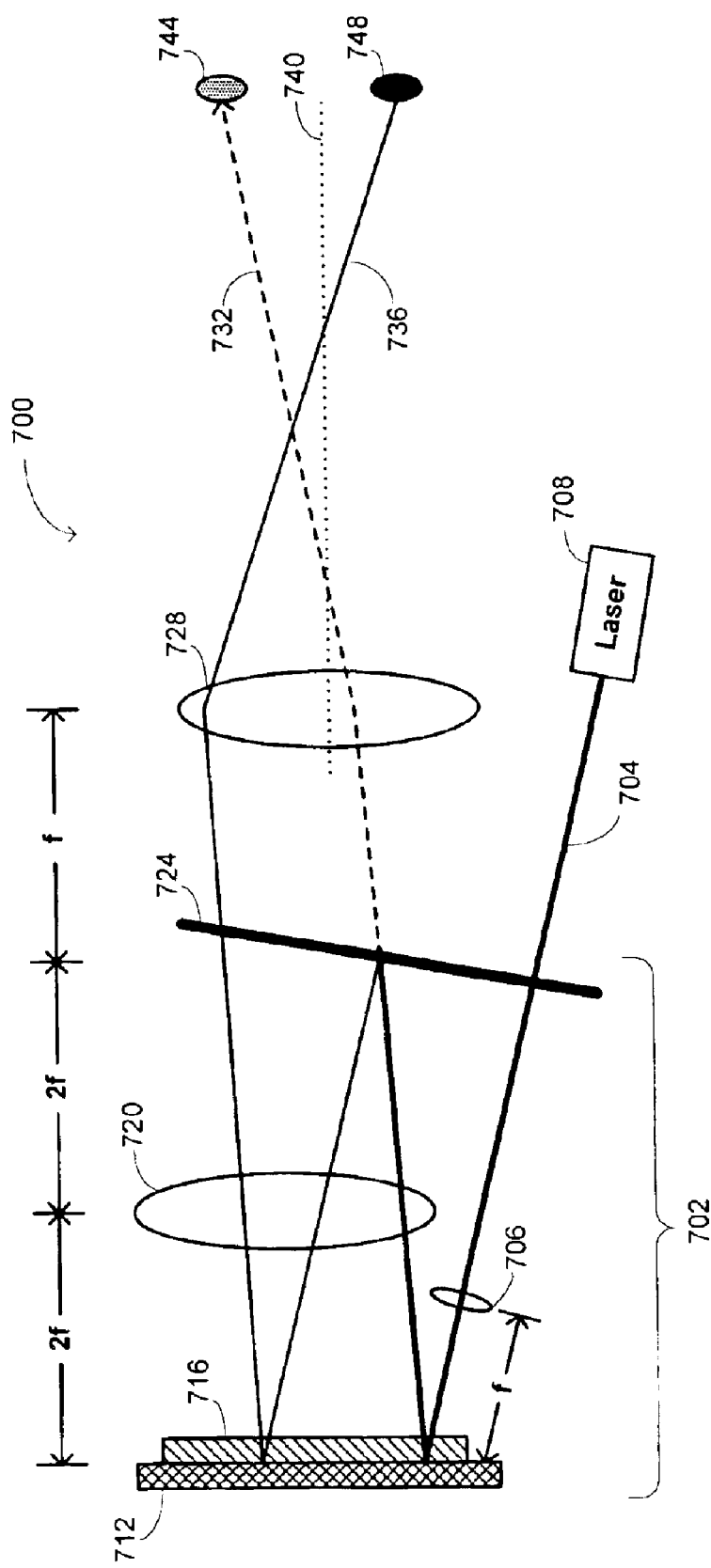
FIG. 7 provides a schematic illustration of an experimental setup used to illustrate one embodiment of the invention.

The inventors have conducted experiments using the setup illustrated in FIG. 7 in order to demonstrate how the nonmechanical spot-beam translation described herein may be used for steering an electromagnetic beam. In this experimental arrangement, the electromagnetic beam 704 is provided by a laser 708. The laser beam 704 is incident onto an optical train 702 that comprises a reflective polarizer 724, a relay lens 720, a reflective element 712, and an SLM 716. This arrangement thus corresponds to use of a reflective SLM arrangement, which was noted above as being suitable in some embodiments. The laser beam 704 is initially transmitted through the reflective polarizer 724 and is focused to a spot on the SLM 716 by lens 706. If the SLM 716 is activated at that position, it transforms the polarization of the beam to include a specified polarization component that will be transmitted through the polarizer 724. In that case, a first beam 732 is transmitted through the polarizer after reflection from the reflective surface 712 and propagation through the relay lens 720. Alternatively, if the SLM 716 is not activated at that position, the beam is reflected back to the SLM 716, which may be activated at the second location to modify the polarization to include the specified polarization component. Another reflection from the reflective surface 712 and transmission through the relay lens 720 again focuses it onto the polarizer 724, where a second beam 736 may then be transmitted through the polarizer 724 at a different final spot position than the first beam 732.

This difference in spot position manifests itself by causing different steering angles to be effected by a steering lens 728, with beam 732 being directed to produce spot 744 and beam 736 being directed to produce spot 748. The optic axis of the steering lens 728 is denoted by reference numeral 740. Thus, the experimental arrangement provides for two possible steering angles depending on the state of the optical train 720, specifically depending on the state of the SLM 716. The angular separation of the two spots 744 and 748 is a function of the f/# of the steering lens 728. The following results were obtained for two different steering lenses, which are easily verified as being consistent with the tan θ=Δx/f relationship described above.

| Steering Angle f/# | Spot Angle Separation | θ$_{max}$ |
|---|---|---|
| 3 | 3.6° | 37° |
| 1 | 9.5° | 53° |

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A device for steering an electromagnetic beam, the device comprising:
   a reflective element;
   a polarizer configured to transmit light of a specified polarization and to reflect light having other than the specified polarization;
   a relay focusing element disposed to provide optical paths for the electromagnetic beam from a first spot position to a second spot position spatially displaced from the first spot position such that the optical paths encounter the reflective element and the polarizer; and
   a modulation element configured for selectively transforming a polarization of the electromagnetic beam to include a component of the specified polarization at a spatially localized position along the optical paths.

2. The device recited in claim 1 wherein at least one of the reflective element and polarizer is inclined with respect to an initial direction of propagation of the electromagnetic beam.

3. The device recited in claim 1 wherein the relay focusing element comprises a lens.

4. The device recited in claim 3 wherein the lens comprises a gradient-index lens.

5. The device recited in claim 3 wherein the lens comprises a lens array.

6. The device recited in claim 1 wherein the reflective element and polarizer are substantially flat.

7. The device recited in claim 1 wherein the relay focusing element is disposed such that the electromagnetic beam is substantially focused at each encounter with the polarizer.

8. The device recited in claim 1 wherein the modulation element comprises a pixellated spatial light modulator.

9. The device recited in claim 8 wherein the pixellated spatial light modulator comprises a transmissive spatial light modulator.

10. The device recited in claim 8 wherein the pixellated spatial light modulator comprises a reflective spatial light modulator.

11. The device recited in claim 1 wherein the modulation element is configured to transform the polarization of the electromagnetic beam to include the component of the specified polarization and to include a component orthogonal to the specified polarization for each of a plurality of encounters of the electromagnetic beam with the modulation element.

12. The device recited in claim 1 wherein the second spot position is displaced in two dimensions from the first spot position within a plane orthogonal to an initial direction of the electromagnetic beam.

13. The device recited in claim 1 further comprising:
   a second reflective element;
   a second polarizer configured to transmit light of the specified polarization and to reflect light having other than the specified polarization;
   a second relay focusing element disposed to provide second optical paths for the electromagnetic beam from the second spot position to a third spot position spatially displaced from the second spot position in a direction nonparallel to a displacement of the second spot position from the first spot position such that the second optical paths encounter the second reflective element and second polarizer; and
   a second modulation element configured for selectively transforming a polarization of the electromagnetic beam to include a component of the specified polarization at a spatially localized position along the second optical paths.

14. A device for steering an electromagnetic beam, the device comprising:
   a focusing lens disposed to focus the electromagnetic beam onto a first spot position;
   a mirror;
   a reflective polarizer configured to transmit light of a specified polarization;
   a relay lens disposed to provide optical paths for the electromagnetic beam from the first spot position to a second spot position such that the optical paths encounter the mirror and the reflective polarizer; and
   a spatial light modulator configured for selectively transforming a polarization of the electromagnetic beam to include a component of the specified polarization at the second spot position.

15. The device recited in claim 14 wherein at least one of the mirror and reflective polarizer is inclined with respect to an optic axis of the focusing lens.

16. The device recited in claim 14 wherein the reflective polarizer is substantially flat.

17. The device recited in claim 14 wherein the mirror is substantially flat.

18. The device recited in claim 14 wherein the relay lens is disposed such that the electromagnetic beam is substantially focused at each encounter with the reflective polarizer.

19. The device recited in claim 14 wherein the spatial light modulator comprises a transmissive spatial light modulator.

20. The device recited in claim 14 wherein the spatial light modulator comprises a reflective spatial light modulator.

21. The device recited in claim 14 wherein:
   the mirror comprises a plurality of mirrors;
   the reflective polarizer comprises a plurality of reflective polarizers;
   the relay lens comprises a plurality of relay lenses, a first of such relay lenses being disposed to provide optical paths for the electromagnetic beam from the first spot position to an intermediate spot position that encounter a first of such mirrors and a first of such reflective polarizers and a second of such relay lenses being disposed to provide optical paths for the electromagnetic beam from the intermediate spot position to the second spot position that encounter a second of such mirrors and a second of such reflective polarizers; and
   the spatial light modulator comprises a plurality of spatial light modulators, a first of such spatial light modulators being configured for selectively transforming the polarization of the electromagnetic beam to include the component of the specified polarization at the intermediate spot position and a second of such spatial light modulations being configured for selectively transforming the polarization of the electromagnetic beam to include the component of the specified polarization at the second spot position.

22. The device recited in claim 14 further comprising a collimation lens disposed to collimate the electromagnetic beam emanating from the second spot position.

* * * * *